(No Model.) 2 Sheets—Sheet 1.

J. B. PRICE.
MECHANICAL MOVEMENT.

No. 484,645. Patented Oct. 18, 1892.

Witnesses:
J. B. McGirr
H. D. Benhard

Inventor:
John B. Price
By his Attorneys,
Edson Bro's (No Model.) 2 Sheets—Sheet 2.

J. B. PRICE.
MECHANICAL MOVEMENT.

No. 484,645. Patented Oct. 18, 1892.

Witnesses:
J. B. McGirr.
W. A. Berukas

Inventor:
John B. Price
By his Attorneys,
Edson Bros.

UNITED STATES PATENT OFFICE.

JOHN B. PRICE, OF WOLLASTON, MASSACHUSETTS.

MECHANICAL MOVEMENT.

SPECIFICATION forming part of Letters Patent No. 484,645, dated October 18, 1892.

Application filed March 30, 1892. Serial No. 427,113. (No model.)

*To all whom it may concern:*

Be it known that I, JOHN B. PRICE, a citizen of the United States, and a resident of Wollaston, in the county of Norfolk and State of Massachusetts, have invented certain new and useful Improvements in Mechanical Movements; and I do hereby declare the following to be a full, clear, and exact description of the invention, such as will enable others skilled in the art to which it appertains to make and use the same.

This invention relates to a mechanical movement; and the nature thereof consists, first, in means whereby the crank or wrist pin can be adjusted radially to the crank-disk, so as to vary the distance and position of said wrist-pin relative to the axis of the disk, in order to change the "throw" of the same, which adjustment of the wrist-pin can be accomplished while the shaft or crank-disk is in motion.

The invention consists, secondly, in means for applying the oscillating motion of the wrist-pin to a shaft which is turned continuously in one direction.

The invention and its application to a valve mechanism of a steam-engine and to an electric motor are fully illustrated in the accompanying drawings, forming a part of this specification, in which—

Figure 1:
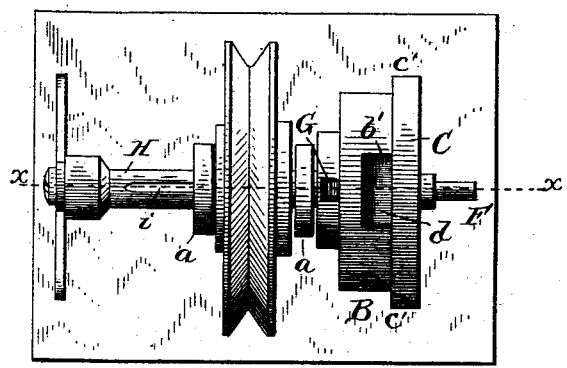
Figure 2:
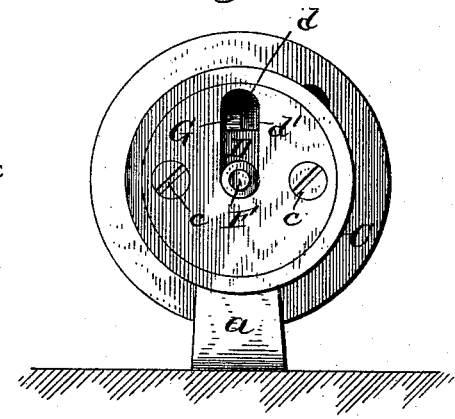
Figure 3:
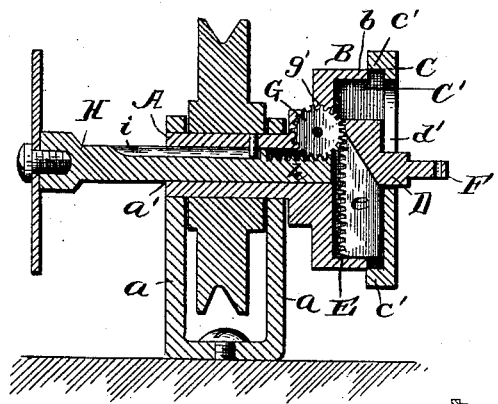
Figure 7:
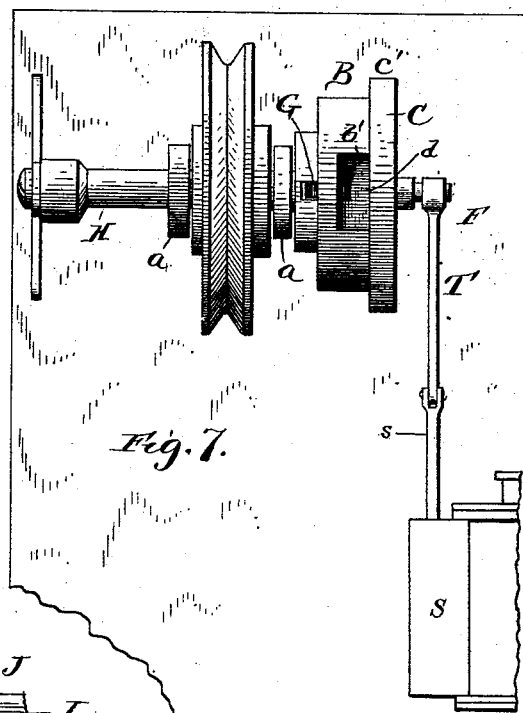
Figure 6:
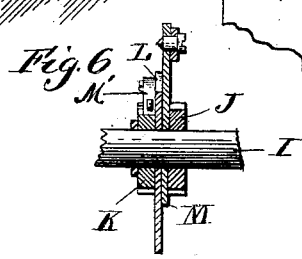
Figure 4:
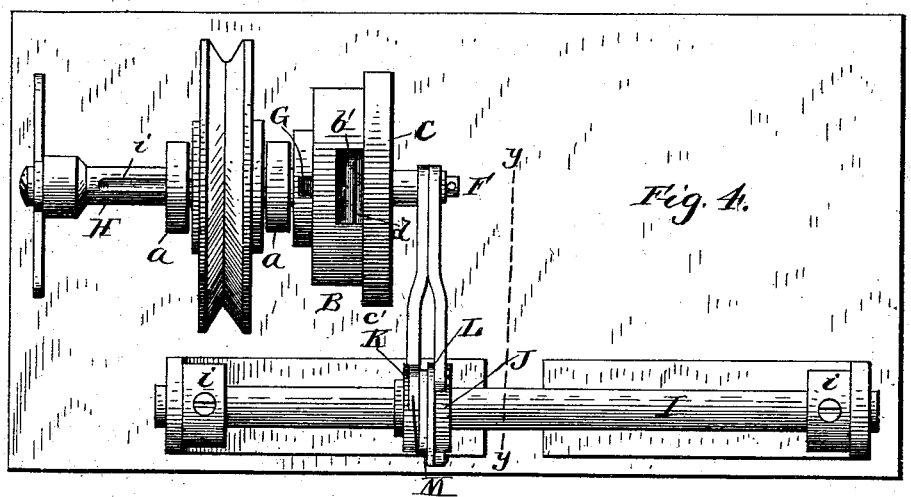
Figure 8:
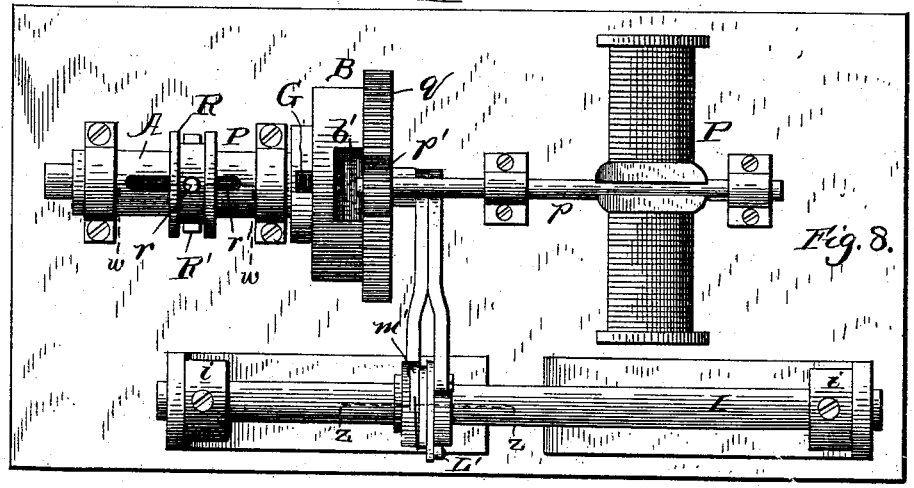
Figures 5, 9:
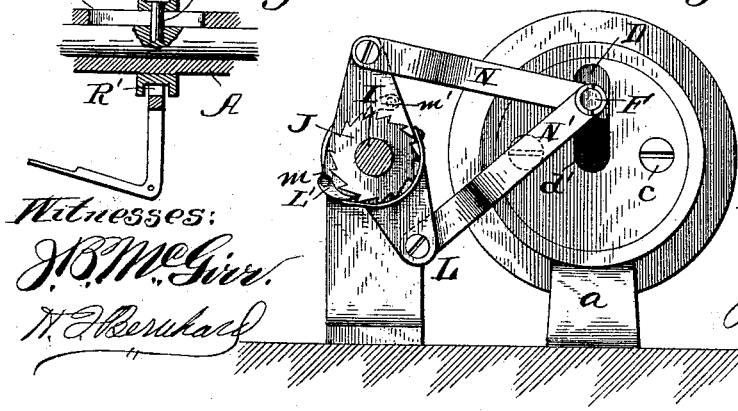

Figure 1 is a plan view of a crank-disk, its wrist-pin, a shaft, and bearing therefor. Fig. 2 is a face view of the crank-disk. Fig. 3 is a sectional view taken longitudinally through the shaft on the plane indicated by the dotted line $x\ x$ of Fig. 1. Fig. 4 is a plan view showing the crank-disk connected to the devices for converting and applying the motion of the wrist-pin to a shaft which is driven continuously in one direction. Fig. 5 is a sectional view through the driven shaft on the line $y\ y$ of Fig. 4, and Fig. 6 is a detail sectional view on the line $z\ z$ of Fig. 8. Fig. 7 is a plan view showing the crank-disk and wrist-pin connected by an intermediate pitman to a slide-valve of a steam-chest, and Fig. 8 is a plan view showing the application of the crank and converting mechanisms to an electric motor. Fig. 9 is a detail view of the treadle and devices employed to move the stem in the adaptation of my invention, illustrated by Fig. 8.

Like letters of reference denote corresponding parts in all the figures of the drawings.

Referring more particularly to Figs. 1, 2, and 3, A designates the rotary shaft which carries the crank-disk B. This shaft is journaled in a suitable bearing $a$ on a pillar-block, bed, or any other support, and this shaft is made tubular in form or provided with a longitudinal passage $a'$. To this tubular shaft, at or near the end of the same, is suitably secured the crank-disk B, into which opens the longitudinal passage or bore $a'$ of the rotary shaft A. This crank-disk is provided with an annular rim $b$, in one part of which is cut or formed a radial recess $b'$, and on said rim $b$ of the disk is screwed a face-plate C by means of screws $c$ or in any equivalent way. This face-plate C has its annular flange arranged on the inner side of its body, as shown in Fig. 3 of the drawings, and through this body or the center $C'$ is cut a radial guideway or groove $d$, which extends entirely across the center $C'$ and which aligns with the radial recess $b'$ in the annular flange of the crank-disk B.

In the face-plate C is provided a slot $d'$, that registers or coincides with the radial guideway $d$ in the center $C'$ of the face-plate, said slot extending in a radial direction from the center of the crank-disk nearly to the edge or perimeter of the disk.

In the radial guideway or groove $d$ of the crank-disk is snugly fitted a slide D, having a longitudinal slot $e$, which opens through the outer side of the slide for about one-half its length, and in the inner open side of this slot is arranged a longitudinal rack E, which is secured to one of the walls of the slotted slide in any suitable way, and this slide is further provided with a wrist-pin F, which projects through the radial slot $d'$ in the face-plate.

In the rear or inner part of the crank-disk is provided a radial recess $g'$, in which is arranged a gear-wheel or pinion G, which is journaled in such relation to the slide D that its teeth mesh with the longitudinal rack E on said slide, and said gear-pinion also projects into the longitudinal bore or passage $a'$ of the rotary shaft to mesh with a rack or teeth $h$ on an endwise movable adjusting-stem H, which is fitted snugly in the bore or passage $a'$ of the rotary shaft A. This stem has its inner end reduced in thickness to adapt the same to pass into and through the slot $e$ of the slide D and into the slot of the face-plate when said stem is forced or thrust inward, and the stem is keyed or splined to the tubular shaft A, as at $i$, to adapt the shaft and stem to rotate or turn together. By withdrawing or pulling the operating-stem longitudinally to its full extent from the shaft A, and until it is arrested by a suitable stop, the gear-pinion G is turned to move the radial slide inward and bring the wrist-pin to the center of the crank-disk. The wrist-pin can be adjusted or moved from this central position to any point between the center and edge of the crank-disk by simply forcing the operating-stem H inward the proper distance and cause its rack $h$ to rotate the gear-pinion G, which in turn moves the attached rack and slide in the radial guideway, thereby varying the throw of the wrist-pin, and as the operating-stem is keyed to the shaft and the crank-disk connected rigidly thereto this adjustment of the wrist-pin can be effected while the parts are in motion.

I have also devised mechanisms for transmitting the motion of the oscillating wrist-pin to a shaft I, which is driven continuously in one direction. This shaft is arranged at one side of and parallel with the main shaft A, journaled in suitable bearings $ii$, and carries two ratchets J K, which are placed side by side with sufficient space between the same for the pawl-carriers L M to operate between. These ratchets are keyed or otherwise rigidly secured to the revoluble shaft I, and the teeth of said ratchets are inclined or extend in the same direction. One of the pawl-carriers L depends from the revoluble shaft I and the other pawl-carrier M extends upwardly therefrom, and the approximate ends of said pawl-carrier are lapped between the ratchets and fitted loosely around the shaft I, so as to turn or move freely around said shaft without influencing the position thereof, except through the action of the pawls on the ratchets. The inner ends of the pawl-carriers have protruding lugs $m\ m'$, and to the lug of the carrier L is pivoted a pawl L', which has a spring that holds its free end normally in engagement with the teeth of the ratchet J, and the lug of the carrier M likewise has a pawl M', which is pressed by another spring into the teeth of the other ratchet K on the shaft I. The free ends of the depending and rising pawl-carriers L M are connected to the outer ends of pitmen N N', and the other ends of said pitmen are connected to the wrist-pin of the crank-disk. During the rotation of the crank-disk and when the wrist-pin thereof is at the nearest point to the shaft I the pawl-carriers assume vertical positions, as indicated in Fig. 5. As the disk rotates and the wrist-pin recedes the pawl-carriers are drawn by the pitman toward the pin, and one of the pawls M' turns the ratchet K, while the other pawl L' slips over the teeth of its ratchet J; but when the wrist-pin passes the dead-center this action of the pawls is reversed, as the pin then advances toward the shaft I, forcing the pitman outward and turning the pawl-carriers to their vertical positions, whereby the pawl L' engages with its ratchet J to turn the shaft I, and the other pawl M' slips idly over the teeth of the ratchet K. The shaft I is thus rotated continuously in one direction by the means employed to transmit and convert the oscillating motion of the wrist-pin.

The crank and converting mechanisms can be used jointly in various arts and relations, and in Fig. 8 of the drawings I have shown the same in connection with an electric motor, I being the driven shaft to which the motion and power of the motor is to be communicated or applied.

P is the motor, which has its armature-shaft $p$ provided with a spur gear-wheel $p'$, that meshes with a gear or teeth $q$, formed on the periphery of the crank-disk B. The endwise-movable stem H is arranged within a tubular shaft A and has a fixed pin $r$, which works in a longitudinal slot $r'$ in the shaft A, said pin being connected to a sliding sleeve R, which fits on the shaft A, and provided with an annular groove for the reception of a bifurcated end of a treadle or lever R', (shown in Fig. 9,) whereby the stem H may be moved longitudinally to adjust the wrist-pin to vary its throw. The crank mechanism, however, may be used independently of the converting or transmitting pawl-and-ratchet mechanism and the shaft I, and in Fig. 7 of the drawings I have illustrated one use of the crank mechanism where it is desirable to give a part-reciprocating motion.

S designates a valve-chest of a steam-engine, in which operates a slide-valve arranged to open and close the steam-ports in said chest. To the protruding end of the valve-stem $s$ is connected a pitman T, having its other end fitted to the wrist-pin of the crank-disk, so that the oscillations of said wrist-pin will serve to reciprocate the valve, and the throw of the wrist-pin can be regulated by the operating-stem to move the valve more or less and admit variable quantities of steam to the piston-cylinder for regulating the speed of the engine.

It is evident that my improvements can be used to advantage in other relations and arts than those herein specified, and I do not therefore restrict myself to the special applications herein shown and described as an embodiment of my invention; nor do I confine myself to the details of construction and form and proportion of parts herein shown and described, as I am aware that the same can be modified and changed by a skilled mechanic without departing from the spirit or sacrificing the advantages of my invention.

What I claim as new is—

1. The combination of a tubular shaft, a radially-slotted disk carried thereby, a wrist-pin fitted in said disk to slide in the radial slot therein, an endwise-movable stem extending through said shaft and connected to the shaft to rotate therewith, and connections between the stem and the wrist-pin to move the latter radially of the disk when the stem is moved lengthwise, as and for the purpose described.

2. The combination of the tubular shaft carrying the radially-slotted disk, a slide fitted in the guide slot or way of the disk and provided with a wrist-pin, an endwise-movable stem extending through and keyed to the tubular shaft, and gear connections between said stem and the radially-movable slide, for the purpose described.

3. The combination of a tubular shaft, the disk rigidly secured to the shaft and provided with the recess in rear of the radial guide slot or way, the slide fitted in said radial guide-slot and carrying the wrist-pin, the endwise-movable stem keyed to the tubular shaft and extending through the same, and an intermediate connection in the recess of the disk and operating to adjust the slide when the stem is moved, as and for the purpose described.

4. The combination of a tubular shaft, a radially-slotted disk carried thereby, a slide fitted to move radially in the guide slot or way of the disk and carrying a protruding wrist-pin, an endwise-movable stem keyed within the tubular shaft, and a gear or pinion journaled in the disk and meshing with rack-teeth on the slide and stem, as and for the purpose described.

5. The combination of a shaft, a crank-disk carried thereby and having a radially-adjustable wrist-pin, a revoluble shaft, as I, and pawl-and-ratchet mechanism on the shaft I and connected to the wrist-pin, as and for the purpose described.

6. The combination of a shaft, a crank-disk thereon, a radially-adjustable wrist-pin carried by said disk and having means connected thereto, whereby said wrist-pin may be adjusted at all times without arresting the shaft, another shaft having two fixed ratchets, pawl-carriers loosely fitted on the last-mentioned shaft and having pawls which engage with ratchets, and connections between the wrist-pin and pawl-carriers, substantially as described.

7. The combination of a revoluble disk carrying a radially-adjustable wrist-pin, a rotary shaft I, and transmitting mechanism, substantially such as described, intermediate of the adjustable wrist-pin, and the rotary shaft to turn the latter continuously in one direction, substantially as and for the purpose described.

In testimony whereof I affix my signature in presence of two witnesses.

JOHN B. PRICE.

Witnesses:
CHAS. F. THAYER,
HENRY J. THAYER.